United States Patent
Chewter et al.

(10) Patent No.: US 12,036,843 B2
(45) Date of Patent: Jul. 16, 2024

(54) THERMAL CONDITIONING SYSTEM INCLUDING SEGMENTED ARCHITECTURE

(71) Applicant: GENTHERM INCORPORATED, Northville, MI (US)

(72) Inventors: Alan Chewter, Ypsilanti, MI (US);
Mobashar Ahmad, Troy, MI (US);
Tyler Myers, Plymouth, MI (US);
Jeremy Swanson, Ypsilanti, MI (US)

(73) Assignee: GENTHERM INCORPORATED, Northville, MI (US)

( * ) Notice: Subject to any disclaimer, the term of this patent is extended or adjusted under 35 U.S.C. 154(b) by 223 days.

(21) Appl. No.: 17/792,877

(22) PCT Filed: Feb. 5, 2021

(86) PCT No.: PCT/US2021/016732
§ 371 (c)(1),
(2) Date: Jul. 14, 2022

(87) PCT Pub. No.: WO2021/158860
PCT Pub. Date: Aug. 12, 2021

(65) Prior Publication Data
US 2023/0050032 A1 Feb. 16, 2023

Related U.S. Application Data

(60) Provisional application No. 62/970,439, filed on Feb. 5, 2020.

(51) Int. Cl.
*B60H 1/00* (2006.01)
(52) U.S. Cl.
CPC ....... *B60H 1/00878* (2013.01); *B60H 1/0075* (2013.01)

(58) Field of Classification Search
CPC . B60H 1/00878; B60H 1/0075; B60H 1/0073
See application file for complete search history.

(56) References Cited

U.S. PATENT DOCUMENTS

| | | | |
|---|---|---|---|
| 11,254,185 B2 * | 2/2022 | Shibuya | B60H 1/00878 |
| 11,718,147 B2 * | 8/2023 | Schumacher | B60H 1/00892 |
| | | | 165/204 |

(Continued)

FOREIGN PATENT DOCUMENTS

| | | | |
|---|---|---|---|
| EP | 2955041 | 12/2015 | |
| WO | WO-2016070052 A1 * | 5/2016 | B60H 1/00285 |
| WO | 2018156136 | 8/2018 | |

OTHER PUBLICATIONS

International Preliminary Report on Patentability for International Patent Application No. PCT/US2021/016732 dated Aug. 18, 2022.

(Continued)

*Primary Examiner* — Ana M Vazquez
(74) *Attorney, Agent, or Firm* — Carlson, Gaskey & Olds, P.C.

(57) ABSTRACT

An example method of providing thermal conditioning includes providing a HAL having a plurality of input drivers that obtain input data from temperature sensors, and a plurality of output drivers that control a discrete thermal effectors in discrete OPZs in a vehicle cabin. An EVAL obtains input data from the HAL and estimates a heat flux experienced by an occupant in each OPZ based on a vehicle profile. An OAL determines a first parameter based on a target heat flux for the occupant across all of the OPZs, determines a second parameter based on the estimated heat flux of the occupant from the EVAL, and determines respective temperature setpoints for each of the plurality of OPZs to reduce a difference between the first and second parameters. The thermal effectors are controlled based on the temperature setpoints.

20 Claims, 12 Drawing Sheets

(56) References Cited

U.S. PATENT DOCUMENTS

| | | | |
|---|---|---|---|
| 2017/0368907 A1* | 12/2017 | Yoneda | G06V 10/143 |
| 2018/0186212 A1 | 7/2018 | Kundu et al. | |
| 2019/0154282 A1 | 5/2019 | Aggarwal et al. | |
| 2020/0331320 A1* | 10/2020 | Saeki | B60H 1/00971 |
| 2021/0291619 A1* | 9/2021 | Aghniaey | B60H 1/00971 |

OTHER PUBLICATIONS

International Search Report for International Patent Application No. PCT/US2021/016732 dated Apr. 30, 2021.

* cited by examiner

THERMAL CONDITIONING SYSTEM INCLUDING SEGMENTED ARCHITECTURE

CROSS REFERENCE TO RELATED APPLICATIONS

This application claims priority to U.S. Provisional Application No. 62/970,439 filed on Feb. 5, 2020, which is incorporated by reference herein in its entirety.

BACKGROUND

This application relates to thermal conditioning in a vehicle cabin, and more particularly to a software stack for a thermal conditioning controller. A software stack is understood to mean a complete software system that is able to independently control the subject system. In this case the software is arranged in compliance with a specific architectural model in layers with interfaces that comply with specific configurations. This architecture is designed to minimize the effort to configure a specific vehicle application while allowing easy portability to various electrical architectures and micro controllers.

An electronic control unit (ECU) in a vehicle may control a plurality of discrete thermal effectors to provide one or more microclimates in the vehicle cabin. Controlling the discrete thermal effectors may involve communicating with respective ECUs of the discrete thermal effectors over a communication bus, and also receiving input from a variety of temperature sensors. This requires the use of software drivers to facilitate the communication between the primary ECU and the distributed ECUs.

For different vehicle manufacturers and even different vehicle models from a same manufacturer, the number and type of discrete thermal effectors may vary. This presents challenges for code re-use between different vehicles.

SUMMARY

A method of providing thermal conditioning in a vehicle cabin according to an example of the present disclosure includes, providing a hardware abstraction layer (HAL) that has a plurality of input drivers that obtain input data from a plurality of temperature sensors, and has a plurality of output drivers that control a plurality of discrete thermal effectors in a plurality of discrete occupant personalization zones (OPZs) in the vehicle cabin. The method includes providing a vehicle and effector abstraction layer (EVAL) that obtains the input data from the HAL and estimates a heat flux experienced by the occupant in each of the OPZs based on a vehicle profile that stores specific attributes of the vehicle. The method includes providing an occupant application layer (OAL) that determines a first parameter based on a target heat flux for the occupant across all of the OPZs, determines a second parameter based on the estimated heat flux of the occupant from the EVAL, and determines respective temperature setpoints for each of the plurality of OPZs to reduce a difference between the first and second parameter. The EVAL hides the vehicle profile from the OAL. The method includes controlling the plurality of thermal effectors based on the temperature setpoints.

In a further embodiment of any of the foregoing embodiments, the specific attributes of the vehicle include a quantity and type of the thermal effectors in each OPZ.

In a further embodiment of any of the foregoing embodiments, the vehicle profile includes a cabin sun load model for estimating a sun load in the vehicle cabin, and the EVAL utilizes the cabin sun load model when estimating the heat flux in at least one of the OPZs.

In a further embodiment of any of the foregoing embodiments, the HAL converts at least a portion of the input data from a first type to a second type prior to providing the input data to the EVAL, the second type having different units than the first type.

In a further embodiment of any of the foregoing embodiments, the first type includes at least one of current and voltage measurements, and the second type includes temperature measurements.

In a further embodiment of any of the foregoing embodiments, the EVAL determines a temperature in each OPZ based on the input data from the HAL, and for each OPZ, the EVAL controls each thermal effector in the OPZ based on a difference between the temperature setpoint for the OPZ and the determined temperature for the OPZ.

In a further embodiment of any of the foregoing embodiments, the vehicle profile includes an indication of how aggressively temperature setpoints should be pursued, and the EVAL determines how aggressively to pursue the temperature setpoint for each OPZ based on the indication.

In a further embodiment of any of the foregoing embodiments, the OAL stores a first temperature range for each thermal effector that includes a minimum setpoint and a maximum setpoint for the thermal effector. The EVAL stores a second temperature range for a particular one of the thermal effectors that differs from and constrains the first temperature range for the particular one of the thermal effectors. The EVAL adjusts the temperature setpoint for a particular OPZ within which the particular one of the thermal effectors resides based on the temperature setpoint falling outside of the second temperature range.

In a further embodiment of any of the foregoing embodiments, the method includes providing a graphical user interface to the occupant using an electronic display in the vehicle, wherein based on receiving an OPZ disable command for a particular one of the OPZs, the OAL commands the EVAL to disable each thermal effector in the particular one of the OPZs.

In a further embodiment of any of the foregoing embodiments, by default the OAL determines the first and second parameter for the occupant based on a default occupant profile, the OAL updates the default occupant profile based on receiving occupant data through a graphical user interface, and the occupant data indicating at least one of occupant gender, occupant weight, and occupant clothing.

In a further embodiment of any of the foregoing embodiments, the method includes providing a graphical user interface (GUI) to the occupant that displays a visual indicator of the temperature setpoint in each OPZ, and based on receiving a temperature offset for a particular OPZ, the OAL adjusts the determined temperature setpoint for the particular OPZ to accommodate the temperature offset.

In a further embodiment of any of the foregoing embodiments, the method includes providing a graphical user interface (GUI) to the occupant that displays a visual indicator of a fan speed of an effector in a particular one of the OPZs, and wherein based on receiving a fan speed offset for the particular OPZ from the GUI, OAL transmits an indication of the fan speed offset to the EVAL, and the EVAL adjusts the fan speed of the effector based on the fan speed offset.

In a further embodiment of any of the foregoing embodiments, providing the HAL and providing the EVAL are performed by a first ECU associated with a first subset of the OPZs, and also by a second ECU associated with a second subset of the OPZs, wherein the second ECU is separate from the first ECU, and the first subset and second subset are not associated with any of the same OPZs. In this embodiment, providing the OAL is performed in the first ECU based on heat flux estimates from the EVAL of both the first and second ECUs.

In a further embodiment of any of the foregoing embodiments, the first parameter and second parameter are each Overall Thermal Sensation (OTS) parameters that are quantified using the Berkley sensation scale.

A thermal conditioning system in a vehicle cabin according to an example of the present disclosure includes a plurality of thermal effectors arranged into a plurality of discrete occupant personalization zones (OPZs) that are each associated with a different occupant body area, such that each OPZ has at least one of the thermal effectors. A controller is configured to provide a hardware abstraction layer (HAL) that has a plurality of input drivers that obtain input data from a plurality of temperature sensors, and has a plurality of output drivers that control a plurality of discrete thermal effectors in the plurality OPZs in the vehicle cabin. The controller is configured to provides a vehicle abstraction layer (EVAL) that obtains the input data from the HAL and estimates a heat flux experienced by the occupant in each of the OPZs based on a vehicle profile that stores specific attributes of the vehicle. The controller is configured to provide an occupant application layer (OAL) that determines a first parameter based on a target heat flux for the occupant, determines a second parameter based on the estimated heat flux of the occupant from the EVAL, and determines respective temperature setpoints for each of the plurality of OPZs to reduce a difference between the first and second parameters. The EVAL hides the vehicle profile from the OAL. The controller is configured to control the plurality of thermal effectors based on the temperature setpoints.

In a further embodiment of any of the foregoing embodiments, the specific attributes of the vehicle include a quantity and type of the thermal effectors in each OPZ.

In a further embodiment of any of the foregoing embodiments, the vehicle profile includes a cabin sun load model for estimating a sun load in the vehicle cabin, and the EVAL utilizes the cabin sun load model when estimating the heat flux in at least one of the OPZs.

In a further embodiment of any of the foregoing embodiments, the controller is configured to operate the EVAL to determine a temperature in each OPZ based on the input data from the HAL, and for each OW, the controller is configured to operate the EVAL to control each thermal effector in the OPZ based on a difference between the temperature setpoint for the OPZ and the determined temperature for the OPZ.

In a further embodiment of any of the foregoing embodiments, the vehicle profile includes an indication of how aggressively temperature setpoints should be pursued, and the controller is configured to operate the EVAL to determine how aggressively to pursue the temperature setpoint for each OPZ based on the indication.

In a further embodiment of any of the foregoing embodiments, the controller is configured to operate the OAL to, by default, determine the first and second parameters for the occupant based on a default occupant profile, and update the default occupant profile based on receiving occupant data through a graphical user interface, the occupant data indicating at least one of occupant gender, occupant weight, and occupant clothing.

In a further embodiment of any of the foregoing embodiments, the first parameter and second parameter are each Overall Thermal Sensation (OTS) parameters that are quantified using the Berkley sensation scale.

A method of providing thermal conditioning in a vehicle cabin according to an example of the present disclosure includes, providing a hardware abstraction layer (HAL) in a first software application that obtains input data from a plurality of temperature sensors, and controls a plurality of discrete thermal effectors in a plurality of discrete occupant personalization zones (OPZs) in the vehicle cabin. The method includes a vehicle abstraction layer (EVAL) in a second software application that obtains the input data from the HAL and estimates a heat flux experienced by the occupant in each of the OPZs based on a vehicle profile that stores specific attributes of the vehicle, wherein the EVAL hides the vehicle profile from the OAL. The method includes providing an occupant application layer (OAL) in a third software application that determines respective temperature setpoints for each of the plurality of OPZs, and controlling the plurality of thermal effectors based on the temperature setpoints.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

FIGS. 4A-C are portions of a combined diagram illustrating an example arrangement for determining the OTS of a vehicle occupant.

DETAILED DESCRIPTION

The present disclosure describes a software architecture for a controller in a microclimate thermal conditioning system (MTCS) for a vehicle. The MTCS includes a plurality of microclimate thermal effectors operable to provide thermal conditioning in a plurality of discrete occupant personalization zones (OPZs) in the vehicle cabin (e.g., head, seat back, seat cushion, hands/arm, and foot/leg).

The controller includes a software stack having a real time operating system and at least three discrete layers: a hardware abstraction layer (HAL), a vehicle and effector abstraction layer (EVAL), and an occupant application layer (OAL). The purpose of the HAL is to encapsulate all configuration for the specific micro-controller (MCU) in which the software is executed. The HAL includes all the low level software necessary to correctly configure and use the various components within the microcontroller of an ECU (e.g., device drivers). The HAL includes drivers and services used to handle all the ECU inputs and outputs and provides for communicating with discrete thermal effectors and temperature sensors. The EVAL obtains input data from the HAL and estimates a heat flux experienced by the occupant in each of a plurality of OPZs based on a vehicle profile that stores specific attributes of the vehicle. The EVAL also commands the HAL to implement temperature setpoints for the thermal effectors which may include devices that are not driven directly by the microclimate system e.g. HVAC. The OAL determines the temperature setpoints to use for the various thermal effectors based on the heat flux from the EVAL and a thermophysiology model (e.g., a minimum setpoint and a maximum setpoint which correspond to a first temperature range). The EVAL hides the vehicle configuration details from the OAL, thereby abstracting details about the vehicle and discrete thermal effectors from the OAL. The calculations in the OAL and the configuration rules that are applied to the application program interface (API) which manages information exchange between the EVAL and the OAL are so designed to enable this abstraction.

In on example, the EVAL stores a second temperature range for a particular one of the thermal effectors that differs from and constrains the first temperature range of the OAL for the particular one of the thermal effectors, and the EVAL adjusts the temperature setpoint for a particular OPZ within which the particular one of the thermal effectors resides based on the temperature setpoint falling outside of the second temperature range. In this manner, the first temperature range of the OAL can be used to denote occupant comfort limits, and the EVAL may constrain that range to the second range for the particular thermal effector based on temperature ranges that is safe for the particular thermal effector and/or an environment in which the particular thermal effector resides.

Figure 1:
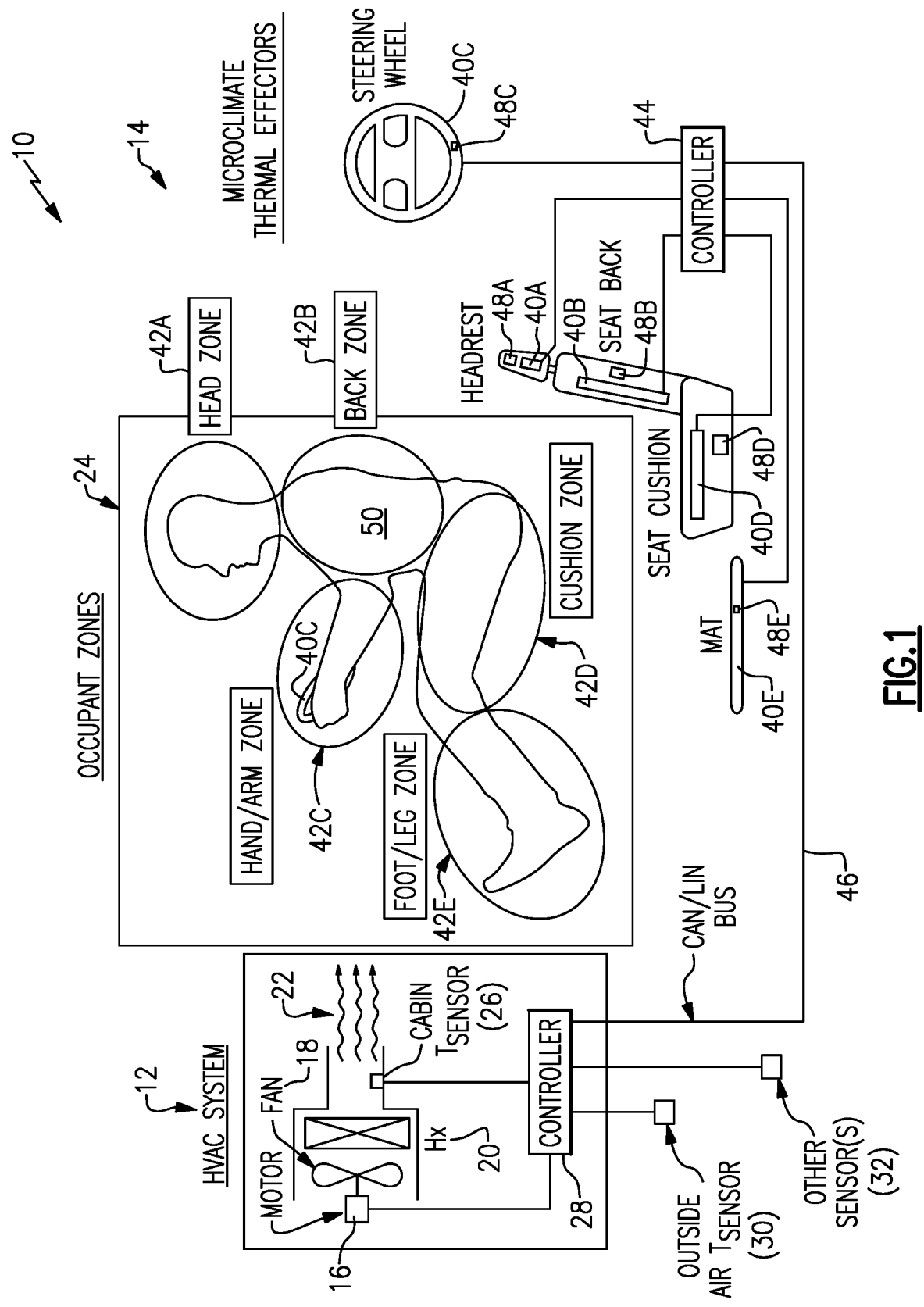
FIG. 1 schematically illustrates a thermal conditioning system that includes an HVAC system and a microclimate thermal conditioning system.

FIG. 1 schematically illustrates a thermal conditioning system 10 that includes an HVAC system 12 and a microclimate thermal conditioning system (MTCS) 14. The HVAC system 12 includes a motor 16 that drives a fan 18 that passes air through a heat exchanger 20 to provide thermally conditioned air 22 within vehicle cabin 24. A cabin temperature sensor 26 provides temperature information to a HVAC controller 28 that is operable to adjust operation of the motor 16 based on temperature readings from the cabin temperature sensor 26. The HVAC controller 28 may also receive information from an outside air temperature sensor 30 and one or more additional sensors 32, for example.

The HVAC controller 28 regulates operation of the HVAC system 12 to a temperature set point that is typically manually adjusted by the occupant. The central HVAC system 12 is insufficient to achieve thermal comfort for each specific occupant and location in many scenarios, so the MTCS 14 is provided to create a unique microclimate for each occupant in the vehicle cabin 24, thereby providing improved overall occupant thermal comfort.

Each occupant of a vehicle typically has unique personal comfort preferences. That is, a particular occupant detects a level of thermal energy differently than another occupant. As a result, the exact same thermal environment within a vehicle may be perceived as comfortable by one occupant, but as uncomfortable by another occupant. To this end, this disclosure provides for occupants to make manual adjustments that control both the central HVAC 12 system and the MTCS 14 in an optimal and coordinated fashion.

There are numerous sources of heating and cooling within a vehicle that impact the occupant's thermal comfort. In one example, the various heating and cooling sources can be represented by an equivalent homogeneous temperature (EHT) within the cabin. EHT represents the total thermal effects on an occupant as a measure of the occupant's heat loss, which produces a whole body thermal sensation. EHT takes into account the combined convective, conductive and radiative effects on the occupant and combines these effects into a single value, which is especially useful for modelling non-uniform thermal environments. One example calculation of EHT can be found in Han, Taeyoung and Huang, Linjie, "A Model for Relating a Thermal Comfort Scale to EHT Comfort Index," SAE Technical Paper 2004-01-0919, 2004. As explained in this SAE paper, which is incorporated by reference in its entirety, the modeled thermal environment is affected by "breath level" air temperature, mean radiant temperature (MRT), air velocity, solar load and relative humidity.

The HVAC system of a vehicle conditions the bulk air within the cabin to achieve a cabin temperature. Other environmental influences on the microclimate environment include vehicle ambient temperature and solar load on the vehicle. One example of using EHT to achieve occupant thermal comfort is described in U.S. Provisional Application No. 62/951,289, entitled "AUTOMATIC SEAT THERMAL COMFORT CONTROL SYSTEM AND METHOD", filed on Dec. 20, 2019, which is incorporated by reference in its entirety.

An occupant's thermal condition, can be expressed using the Berkeley Sensation and Comfort Scale ("Berkeley scale"), described in, for example, Arens E. A., Zhang H. & Huizenga C. (2006) Partial- and whole-body thermal sensation and comfort, Part I: Uniform environmental conditions. *Journal of Thermal Biology*, 31, 53-59. The Berkley scale numerically represents thermal sensation as: −4 very cold, −3 cold, −2 cool, −1 slightly cool, 0 neutral, 1 slightly warm, 2 warm, 3 hot, 4 very hot. It should be understood that other approaches could be used to quantify an occupant's thermal condition. Overall thermal sensation (OTS) is a measure of the thermal sensation experienced by a particular occupant based upon the heat transfer rates to their body. Each level of the Berkley scale is indicative of a difference between a current heat flux of the user and a desired heat flux of the user.

The MTCS 14 may have many discrete occupant microclimate zones, or Occupant Personalization Zones (OPZs). According to ISO 145045-2:2006 (E), a human body can be divided into different body segments, such as hand, head or chest, and each segment may have a different thermal comfort temperature range. The five example zones in FIG. 1 are head, back, cushion (thigh and buttocks), foot/leg, and arm/hand. Fewer, more and/or different zones may be used if desired.

Referring still to FIG. 1, the MTCS 14 includes a plurality of discrete microclimate thermal effectors 40A-E which are each disposed in a respective OPZ 42A-E. In the example of FIG. 1, the OPZs 40 includes a head zone 42A, a back zone 42B, a hand/arm zone 42C, a cushion zone 42D, and a foot/leg zone 42E. A variety of the OPZs 42A-E and could be used in different vehicles.

Each OPZ 42 provides a microclimate for a specific zone in contact with a particular vehicle occupant. An example vehicle occupant 50 shown in FIG. 1 is a driver that has access to a steering wheel. Other vehicle occupants would likely not have a steering wheel, but could still have other devices that effect the climate in that zone, for example heated and cooled surfaces, radiant heating panels, HVAC vents, sun loads etc. For each of the OPZs shown 42A-E the software is configured to account thermodynamically for all of the methods of heat transfer that effect that zone, both controlled effectors including HVAC and uncontrolled loads such as radiation from the sun. The climate in that zone is then controlled according to the actual state of the climate in that zone compared with the desired state of the climate in that zone. Although only a single microclimate thermal effector 40 is shown in each OPZ 42, it is understood that multiple thermal effectors 40 could be included in a particular OPZ 42.

A variety of thermal effectors 40 could be used in each OPZ, such as resistive electrical heaters, thermoelectric devices which use Peltier effect to provide for heating or cooling, convective thermal conditioning devices which provide for air flow (e.g., air flow from within the vehicle seat to the OPZ 42), etc. Some example thermal effectors that could be used in the system 10 include, but are not limited to, for example, climate controlled seats (see, e.g., U.S. Pat. Nos. 5,524,439 and 6,857,697), a neck conditioner mounted in a head rest or upper seat back (see, e.g., U.S. Provisional App. No. 62/039,125), a climate controlled headliner (see, e.g., U.S. Provisional App. No. 61/900,334), a climate controlled (e.g., heated) door panel and/or instrument panel, a heated steering wheel (see, e.g., U.S. Pat. No. 6,727,467 and U.S. Pub. No. 2014/0090513), a heated gear shifter (see, e.g., U.S. Pub. No. 2013/0061603, etc.), heater mats (which may be installed in seat and other surfaces surrounding or in contact with the vehicle occupant 50), a mini-compressor system configured to deliver a thermal effect to the vehicle occupant 50 by convective heat transfer from cooled and conditioned air (see, e.g., International Application No. WO2018049159A1), and/or a convective thermal effector capable of heating or cooling located in the seat back or cushion to achieve a personalized microclimate.

The microclimate system provides desired occupant personal comfort in an automated manner with little or no input being required from the occupant. All or some of these devices can be arranged to optimally control the thermal environment around an occupant of a seat located anywhere inside a passenger vehicle. In addition, these components can be used to regulate thermal comfort separately for individual segments or personalization zones of the occupant's body.

A controller 44 controls each of the thermal effectors 42. The controller 44 is in communication with the HVAC system controller 28 through a communication bus 46 which may include a control area network (CAN) bus and/or a local interconnect network (LIN) bus, for example. The controller 44 is also in communication with a plurality of distributed cabin temperature sensors 48A-D disposed in one or more of the OPZs 42. Although five local temperature sensors 48A-E are shown in FIG. 1, it is understood that other quantities of OPZ temperature sensors 48 could be used (e.g., fewer or more than five OPZ temperature sensors). Partitioning the body into zones has two purposes. First, the human body and its local environment can be modelled so that the overall heat transfer rate to the body can be determined. This is used to assess the current state of thermal comfort for each occupant in the vehicle. The higher the number of segments, the more accurate the thermal model can be. The ideal number of zones for the accuracy of the thermodynamic model may be limited by the number of sensors available in current vehicle cabins. Secondly, the occupant may prefer to differentiate the thermal environment around their body according to the specific zone, such as head, feat etc. Even with sensing limitations, the optimal number of thermodynamic zones may exceed the number preferred for personalization and control by the occupant. In fact, occupants generally prefer a more limited number of zones when considering preferences. Therefore, the control software resolves an accurate thermodynamic multi zone model used for estimation, into a smaller number of occupant personalization zones in order to provide automatic control and personalization at the same time.

Figure 2:
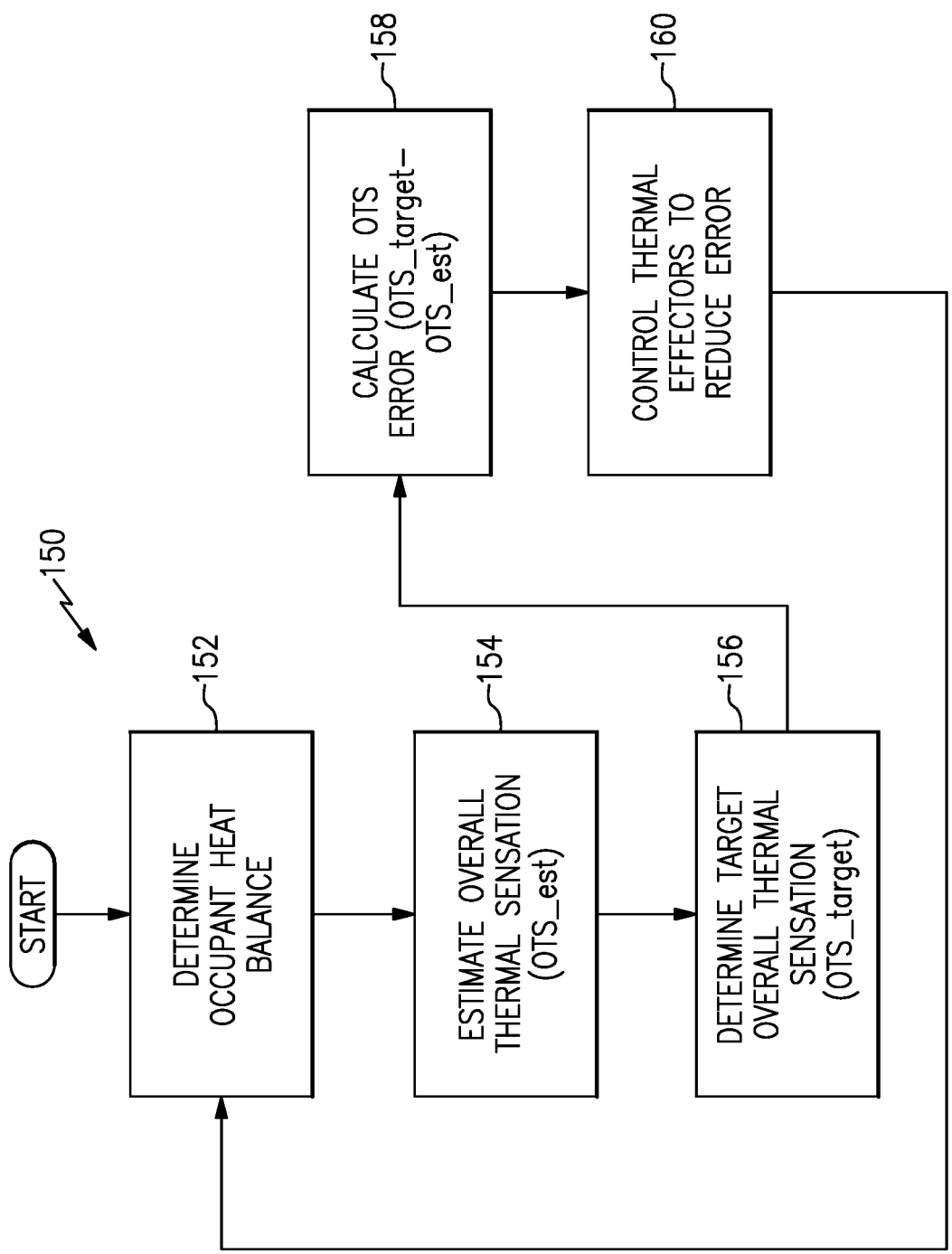
FIG. 2 is a flow chart that depicts an example method for controlling a plurality of microclimate thermal effectors.

FIG. 2 is a flowchart 150 that shows how the controller 44 controls the plurality of microclimate thermal effectors 40. The controller 44 is capable to determine optimal setpoints for devices that are not under the direct control of the microclimate system, e.g. HVAC or other effectors, by including mathematical models of these devices in the same manner as those devices under direct control e.g. seat heaters etc. Alternatively, the controller 44 may cooperate with other climate control systems by splitting and separately controlling zones within specific power budgets. In any of these scenarios, the controller 44 determines a heat balance for the occupant 50 in the vehicle cabin 24 (step 152), which represents the total thermal effects on the occupant 50 as a measure of the occupant's heat loss, which produces a whole body thermal sensation. In one example, the heat balance is determined as an "equivalent homogeneous temperature," as described in application No. 62/951,289, the disclosure of which is incorporated herein by reference in its entirety.

Having determined the heat balance, the controller 44 estimates an OTS experienced by the occupant 50 ("OTS_est") (step 154). OTS_est is indicative of an estimated heat flux experienced by the occupant 50 (e.g., across some or all of the OPZs 42). The controller 44 also determines a target OTS ("OTS_target") for the occupant 50 (step 156). Similarly, an OTS_target is calculated using an inversion of the same thermophysiology model as the estimate but with nominal conditions of heat transfer rate and occupant profile. The inversion of this heat transfer model allows the user to input a 'set temperature' which the control software is able to convert into an equivalent target OTS. The occupant profile may be a default profile that assumes or infers details about a weight, gender, and clothing of the occupant, or may be customized by the occupant to provide such details. OTS_target is indicative of a desired heat flux for the occupant 50 (e.g., across some or all of the OPZs 42). The OTS_target is also calculated based on a global temperature setpoint for the occupant across all of the OPZs 42, which may be provided based on a default value, or based on a specific occupant-provided value.

The controller 44 calculates an error between the two OTS metrics as OTS_target−OTS_est (step 158). A positive error indicates that OTS_est is lower than OTS_target, and correspondingly indicates that the vehicle occupant 50 should be heated in some or all of the OPZs 42. Conversely, a negative error indicates that OTS_est is greater than OTS_target, and correspondingly indicates that the occupant 50 should be cooled in some or all of the OPZs 42. The controller 44 controls the plurality of thermal effectors 40 to reduce the error of step 158 (step 160).

The one example, the OTS is determined using an equation in the form of a sigmoid function with terms related to specific occupant thermal characteristics in combination with the calculated heat loss to the occupant's body, such as the equation below:

$$\text{OTS\_est} = \frac{e}{1 + \exp(-A \times (HeatLoss_{Body} + B))} - 3 \qquad \text{(equation 1)}$$

where HeatLoss$_{Body}$ corresponds to the heat flux of the occupant across the plurality of OPZs 42, and A and B are coefficients which relate to a number of environmental and occupant factors such as seasonal effects on the heat flux.

In one example, the controlling of step 110 is based on a relative ranking of each thermal effector 40 (e.g., on a scale of 0-1.5) that indicates an order of preference for the effector 40 and/or OPZ 42 for a given occupant. As an example, a given occupant may prefer that thermal conditioning is conducted primarily through effector 40A and could therefore assign a higher ranking to the effector 40A than to other effectors. Conversely, another occupant may wish to deemphasize the effector 40A and instead prefer that thermal conditioning is conducted more significantly through effector 40D. That occupant could assign a higher ranking to effector 40D than to effector 40A. The ranking allows occupants 50 to indicate their desired priority.

In an "AutoComfort" mode the ranking can be multiplied by the OTS error (e.g., using equation 2 below) to determine an OPZ-specific OTS value.

OTSerrEffector=OTSerrNormalized*EffectorRanking    (eq. 2)

In one example, this rank for a thermal effector is increased by a first amount if the occupant requests a change in the setpoint for that effector (e.g., an increase during heating or a decrease during cooling). If the effector is turned off by the occupant, then the rank is reduced by a second amount that is larger than the first amount.

In an "AutoOptimal" mode the ranking is multiplied by an effectiveness value with same range to reflect the power delivered/power consumed by each thermal effector. The objective is to 'weight' the correction applied to the setpoint of each device according to preferences only (in AutoComfort) and preferences and effectiveness (in AutoOptimal).

Figure 3:
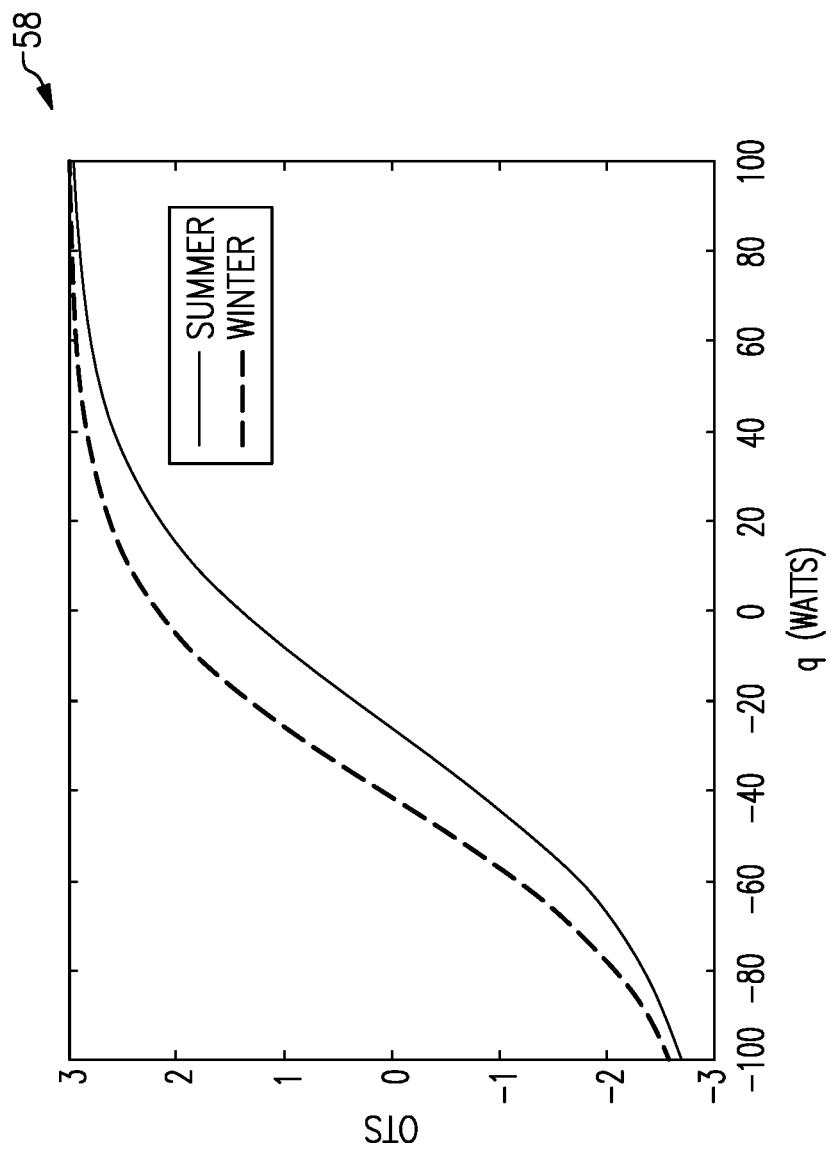
FIG. 3 is a graph depicting an example of how an overall thermal sensation (OTS) experience by a vehicle occupant can vary between seasons.

FIG. 3 is a graph showing how OTS may vary between summer and winter. The Y axis represents OTS, and the X axis represents a heat transfer rate "q" which is measured in Watts (joules per second). As shown in FIG. 3, the occupant 50 experiences a different OTS at the same heat transfer rate depending on the season, with winter weather generally causing the occupant 50 to experience a given OTS at a lower heat transfer rate than summer weather.

Figures 4, 4A:
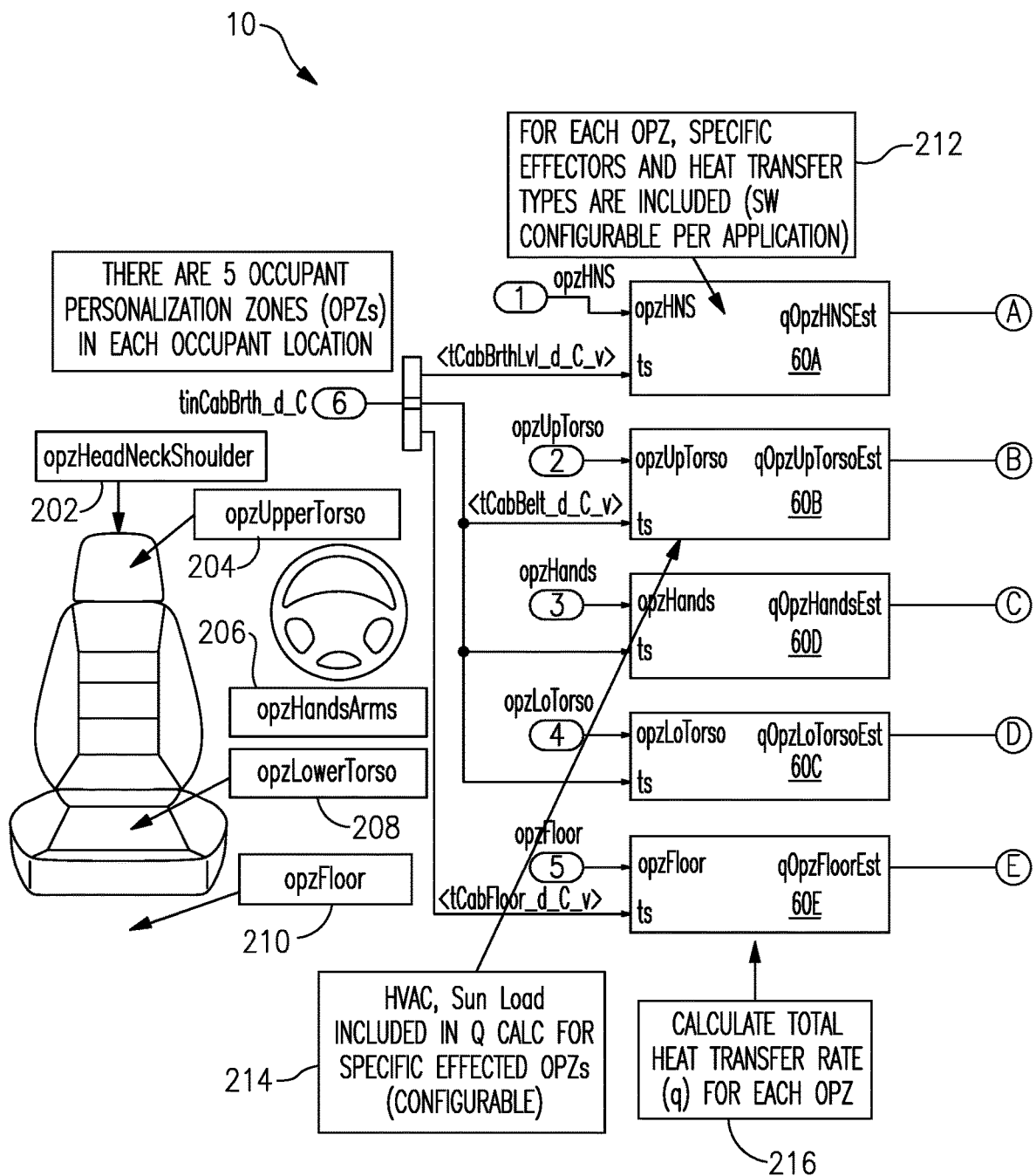
FIG. 4 is a diagram illustrating how
FIGS. 4A, 4B, and 4C are arranged.
Figure 4B:
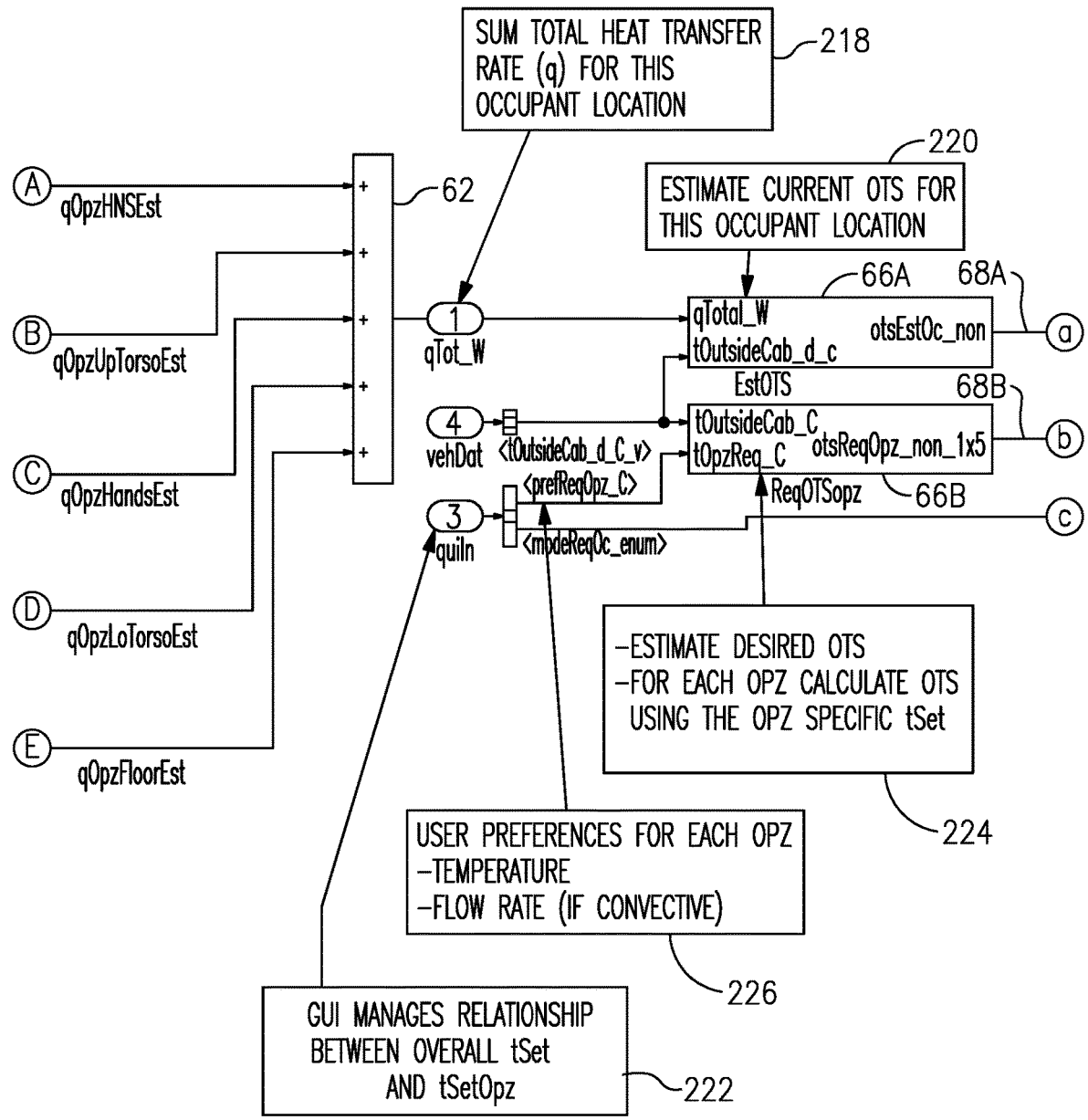
Figure 4C:
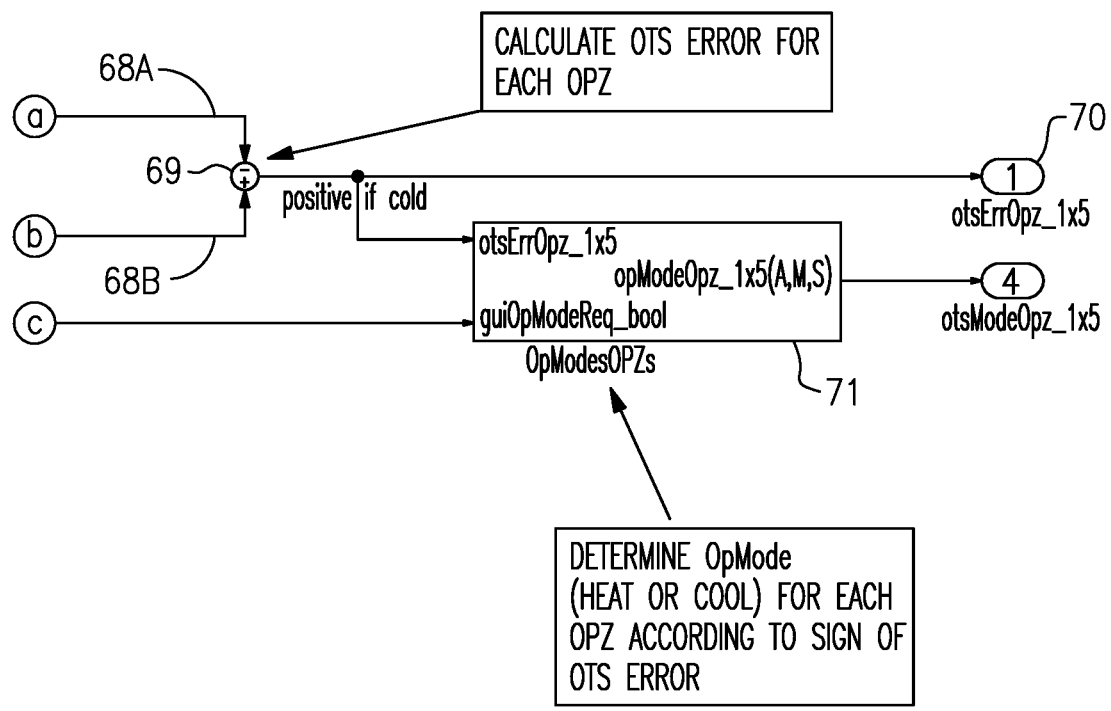

FIG. 4 is a diagram illustrating an example arrangement for determining OTS_est and OTS_target, which includes FIGS. 4A, 4B, and 4C. Referring now to FIGS. 4A, 4B and 4C, a respective estimator 60A-E for each OPZ 42 calculates a total heat transfer rate (Q) for its respective OPZ 42. Optionally, some of the estimators 60 may account for thermal conditioning from the HVAC system 12 and/or a sun load experienced by the vehicle when the HVAC system 12 and/or sun load have a significant effect on the OPZ 42. In particular, the estimator 60B may benefit from such consideration, since the upper torso of the occupant 50 is likely to be affected by these factors. The respective estimator 60 output their OPZ-specific heat transfer rates which are summed by a summing device 62 to determine an overall heat transfer rate 64. The summing device 62 combines the heat transfer for each of the OPZs zones to understand the total heat transfer to or from the vehicle occupant 50. This total heat transfer to the occupant 50 can then be used to calculate other metrics to quantify the occupant's thermal comfort (ex. OTS, EHT, Predicted Mean Vote (PMV) and Predicted Percentage of Dissatisfied (PPD), etc.) and then to control the system accordingly.

A first OTS calculator 66A takes that total heat transfer from the summing device 62 and calculates OTS_est and provides OTS_est as an output 68A. A second OTS estimator 66B determines an OTS_target for the vehicle occupant 50 and provides OTS_target as an output 68B. The estimator 66A bases its determination on user preferences (e.g., from a graphical user interface) and/or a power budget for the various microclimate thermal effectors 40.

A summing device 69 determines the difference between the OTS_target and OTS_est to determine an OTS error 70 which the controller 44 uses to determine setpoints for the various thermal effectors 40. An OTS mode module 71 determines whether each thermal effector 40 will provide heating or cooling based on the OTS error 70, and further based on any occupant-provided temperature offsets (e.g., OPZ-specific temperature offsets).

Figure 5:
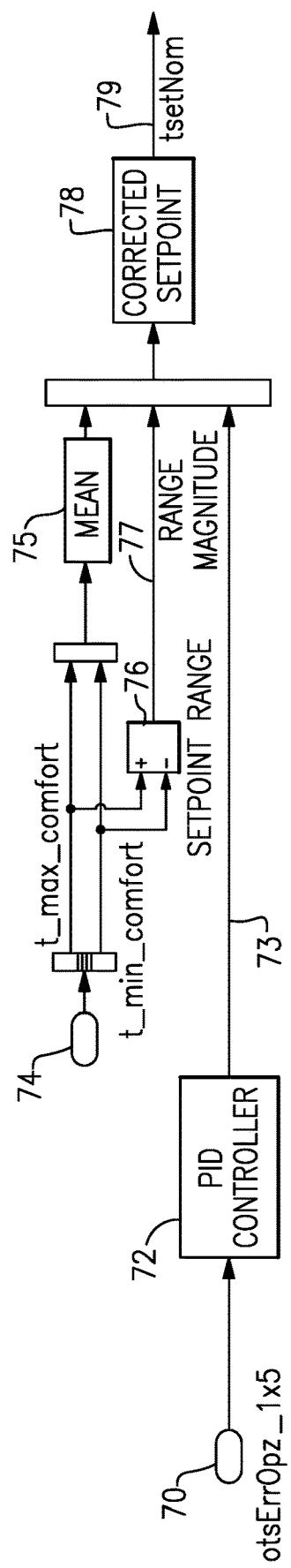

FIG. 5 is a diagram illustrating an example arrangement for determining a corrected temperature setpoint based on the OTS error 70 shown in FIG. 4C. The OTS error 70 is provided to a proportional-integral-derivative (PID) controller 72 which is configured to analyze the OTS error 70, and provide an OTS error output 73 that is based on a proportional term, integral term, and derivative term, using known PID control techniques. Each of these terms is unique to each effector, in one example. The integral term (not shown in FIG. 5, and which is characterized by an accumulation of the OTS error 70), and the derivative term (not shown in FIG. 5, and which is characterized by a rate of change of OTS error 70 over time). The example discussed below assumes that the integral and derivative terms are 0, but it is understood that non-zero values could be used for those terms using known PID control technique A thermal conditioning range 74 that includes a maximum temperature (t_max_comfort) and a minimum temperature (t_min_comfort) is provided. As an example, assume that the t_max_comfort for a particular OPZ 42 is 10° C. and that t_min_comfort for the particular OPZ 42 is 0° C. Block 75 determines a mean of the values (5° C. in this example), and block 76 determines a magnitude 77 of the range (10° C. in this example). Block 78 determines a corrected setpoint (tsetNom) 79 based on these inputs. In one example, block 78 uses equation 3 below $$tsetNom = u(1) + \frac{x(2) * u(3)}{100} \qquad \text{(eq. 3)}$$

where u(1) represents the nominal setpoint;
u(2) represents the range magnitude; and
u(3) represents the OTS error output 73.

Using the example values discussed above, u(1) would equal 5° C. and u(2) would equal 10° C. For the sake of discussion, assume that the OTS error output 76 corresponding to u(3) is a 20% error (indicating that OTS_target is 20% higher than OTS_est). Using these values, tsetNom would equal (5+(10*20)/(100), or 7° C.

Figure 6:
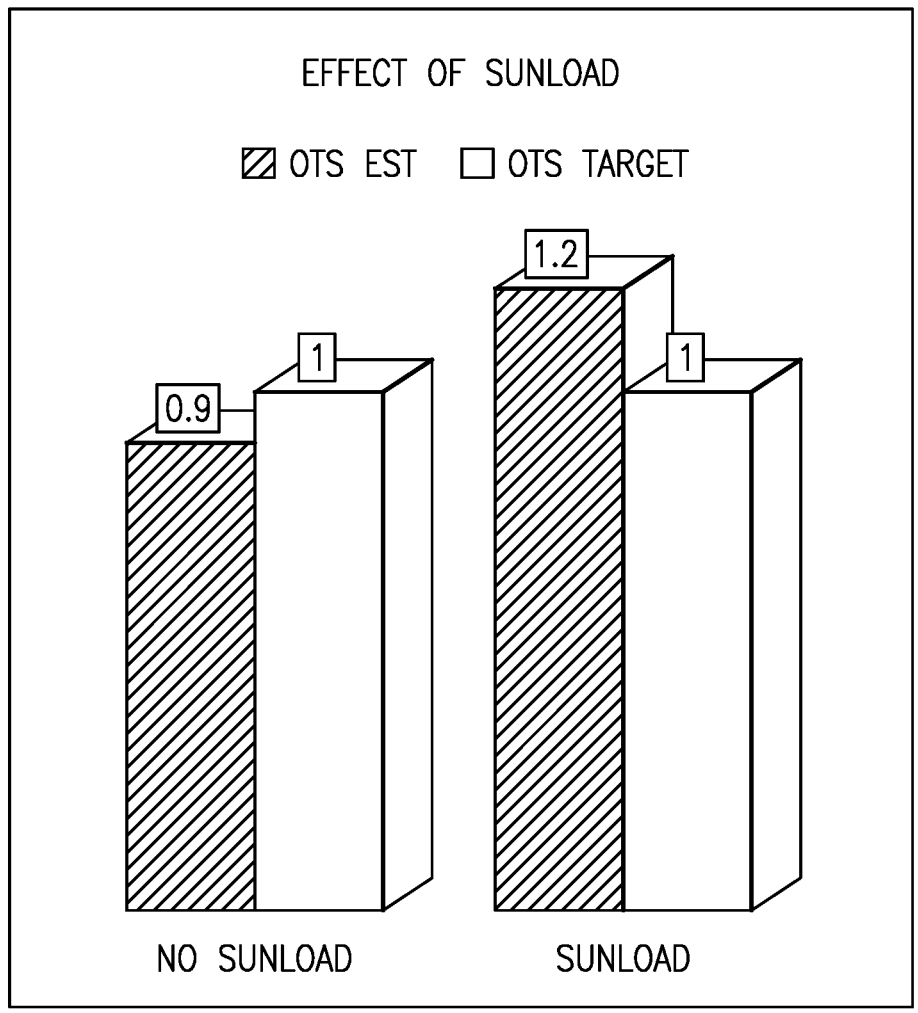
FIG. 6 is a diagram illustrating an example effect that sun load can have on OTS.

FIG. 6 is a diagram illustrating an example effect that sun load can have on the OTS. As shown in the example of FIG. 6, when there is no sun load for a particular exterior temperature, OTS_est is less than OTS_target, but when there is a sun load, OTS_est may be greater than OTS_target. Thus, sun load may cause the vehicle occupant 50 to feel warmer, and therefore less thermally comfortable than they would otherwise feel absent the sun load. The effect of sun load on OTS_est is an example of how the control software uses a thermophysiology-based model to control the micro climate around each occupant by compensating for thermal disturbances.

Figure 7:
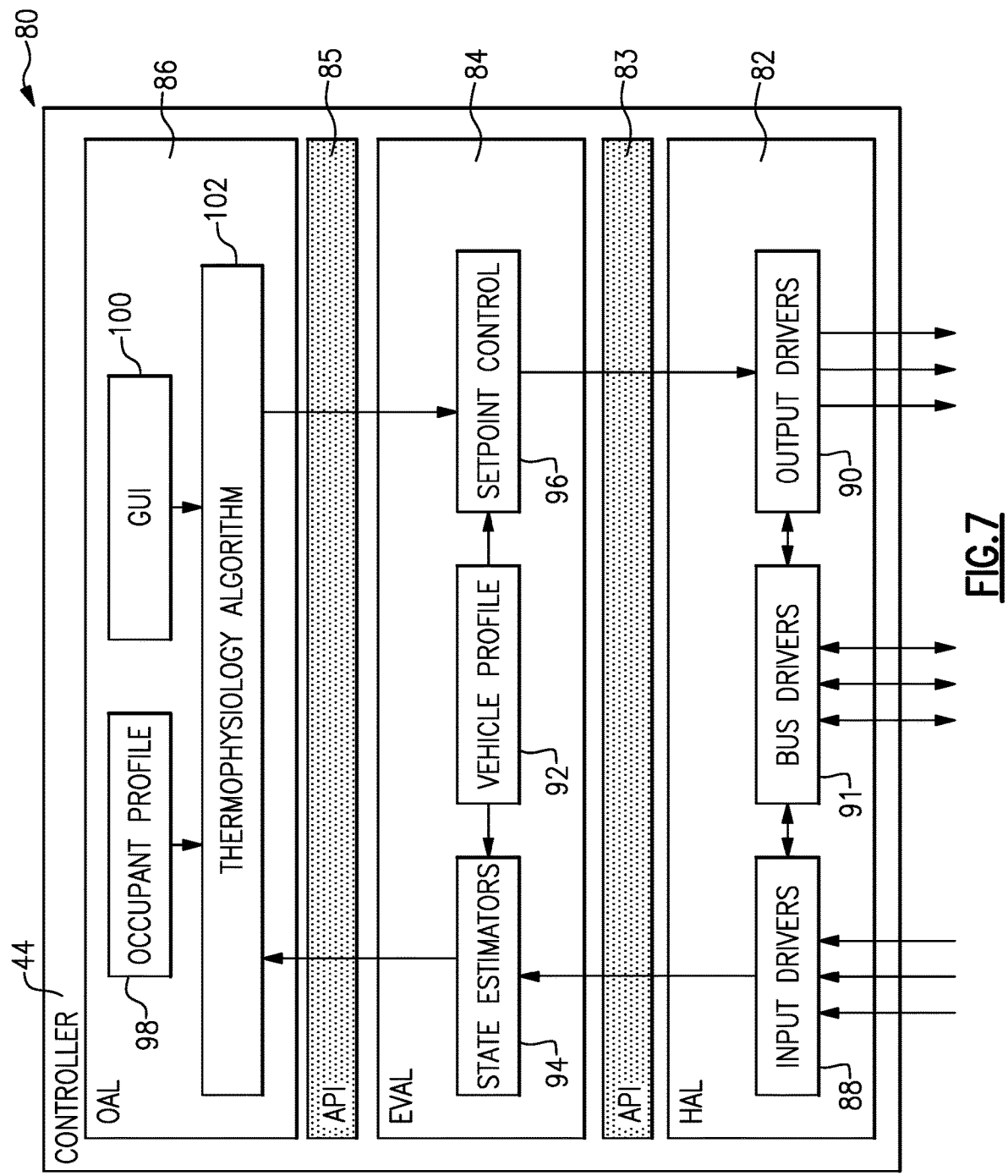
FIG. 7 illustrates an example software architecture for a controller of FIG. 1.

FIG. 7 illustrates an example software architecture 80 for the controller 44 of FIG. 1. The controller 44 includes a hardware abstraction layer (HAL) 82, vehicle and effector abstraction layer (EVAL) 84, and occupant application layer (OAL) 86. Application programming interface (API) 85 supports communication between the HAL 82 and EVAL 84, and API 85 supports communication between the EVAL 84 and OAL 86.

The HAL 82 includes input drivers 88, output drivers 90, and bus drivers 91. The input drivers 88 are software drivers that enable the HAL 82 to receive input from distributed temperature sensors 48 in the vehicle cabin 24. The output drivers 90 are software drivers that enable the HAL 82 to directly control various microclimate thermal effectors 40 in the vehicle cabin 24. The bus drivers 91 are software drivers that enable the HAL 82 to utilize the communication bus 46, which as discussed above could be a CAN or LIN bus. Bus communication includes sharing of data with the vehicle systems including HVAC, as well as sending commands to ECUs that may control various microclimate thermal effectors in the vehicle cabin. The ECUs that directly control various thermal effectors may also communicate back various effector state parameters (temperature, current, flow rate, operating state etc) as well as ECU, sensor and effector fault and default operation information.

The EVAL 84 includes a vehicle profile 92, state estimators 94, transfer functions and a setpoint control 96. The vehicle profile 92 stores specific attributes of the vehicle, and is hidden from the OAL 86. The EVAL 84 can include any one or combination of the following items discussed below.

(A) Quantity and type of the thermal effectors in each OPZ 42—This could vary between vehicle product lines for a given vehicle original equipment manufacturer (OEM), and could also vary based on the particular options package selected for a particular vehicle model.

(B) Cabin sun load model—This can be used for estimating the sun load in various parts of the vehicle cabin 24, and could vary depending on the size and geometry of the windshield and other windows of the vehicle (e.g., sunroof present or absent). This could include the area and thermal resistivity of the glass of the vehicle cabin 24, for example.

(C) Indication of how aggressively thermal conditioning setpoints—A particular OEM may want to approach a thermal setpoint more aggressively in their vehicles, whereas another OEM may wish to pursue the thermal setpoint more conservatively and gradually (e.g., to avoid overshooting the thermal setpoint).

(D) OEM-acceptable thermal conditioning ranges—The system 10 may have a predefined thermal conditioning range for each OPZ 42 for each OPZ deemed to be comfortable to a typical passenger {t_max_comfort, t_min_comfort}. However, an OEM may have a different range that is broader or narrower. The vehicle profile could account for these differences by narrowing or expanding the predefined thermal conditioning range for a given OPZ.

(E) Quantity of seats in the vehicle cabin 24 that include thermal effectors—This may differ between vehicles. Also, some seats, although present, may not have microclimate thermal conditioning features.

(F) Power capacity and thermal characteristics of various thermal effectors including those devices that are not directly controlled by the microclimate system e.g. HVAC 40 and/or OPZs 42—One OEM may permit giving 90 watts of power to a neck warmer, but another may permit giving 120 watts of power.

(G) Volume of foot well corresponding to the food/leg OPZ 42E—This may affect how much heat is needed to achieve a temperature setpoint in the foot/leg OPZ 42E.

(H) Thermal characteristics of the seats and cushions—This may affect how much heat is needed to achieve a temperature setpoint at the seat surfaces.

Because the EVAL 84 hides the vehicle profile 92 from the OAL 86, the OAL 86 can remain ignorant about these factors and their influence on thermal conditioning.

The state estimators 94 of the EVAL 84 receive input data from the input drivers 88 and use the input data to determine a temperature in each OPZ 42, and a heat flux experienced by the occupant in each OPZ 42. Thus, the EVAL 84 may provide the estimators 60A-E of FIGS. 4A-C, which includes mapping the input data from the HAL 82 to particular OPZs 42.

In one example, prior to providing the input data to the state estimators 94, the HAL 82 conditions the data by converting it from a first type to a second type (e.g., convert from amps, volts, hertz, or some thermal effector device units to temperature values). The HAL 82 could provide the same unit conversions in reverse when providing commands to the thermal effectors 40 (e.g., converting temperatures to amps, volts, and/or hertz values).

The setpoint control 96 receives discrete OPZ 42 temperature setpoints from the OAL 86 and determines how to implement the setpoints. This determination is based on a variety of factors, including a difference between the temperature setpoint for each OPZ 42 and the actual temperature in each OPZ 42 (as here in here, "actual" could be measured in the OPZ or inferred from a nearby sensor), the type of thermal effectors 40 in OPZ, and/or the vehicle profile 92. The determination of how to implement the setpoints could include determining a fan speed for a particular thermal effector 40, a power/current/voltage to provide to the particular thermal effector 40, etc., for example.

The OAL 86 includes an occupant profile 98 that includes information about a particular occupant. This could include default information, such as default weight, default gender, default clothing, and/or could be customized by the occupant 50 via a graphical user interface (GUI) 100. The GUI 100 in some examples can also be used to receive other input from the occupant 50, such as which OPZs 42 to enable/disable and also specific thermal conditioning offsets to use in particular ones of the OPZs 42. Based on the enable/disable commands, the HAL 84 can enable or disable all of the thermal effectors 40 in a particular OPZ 42. The GUI 100 can also be used to provide a visual indication of the thermal conditioning setpoint for each OPZ, and thereby allow the occupant 50 to adjust that setpoint by introducing a temperature offset and/or a fan speed offset.

As discussed above, the thermal conditioning offset could be received from the user as a temperature offset (e.g., increase by 2° C. or decrease by 1° C.) or a general offset (e.g., make OPZ hotter or cooler by X number of units, where X corresponds to a scale presented in a user interface that is accessible to the vehicle occupant, such as a dial or slider, having units mapped to discrete temperature offsets).

The OAL 86 also includes a thermophysiology algorithm 102 for determining a parameter, such as OTS, based on the heat flux values from the EVAL 84 as discussed above in FIG. 2.

Figure 8A:
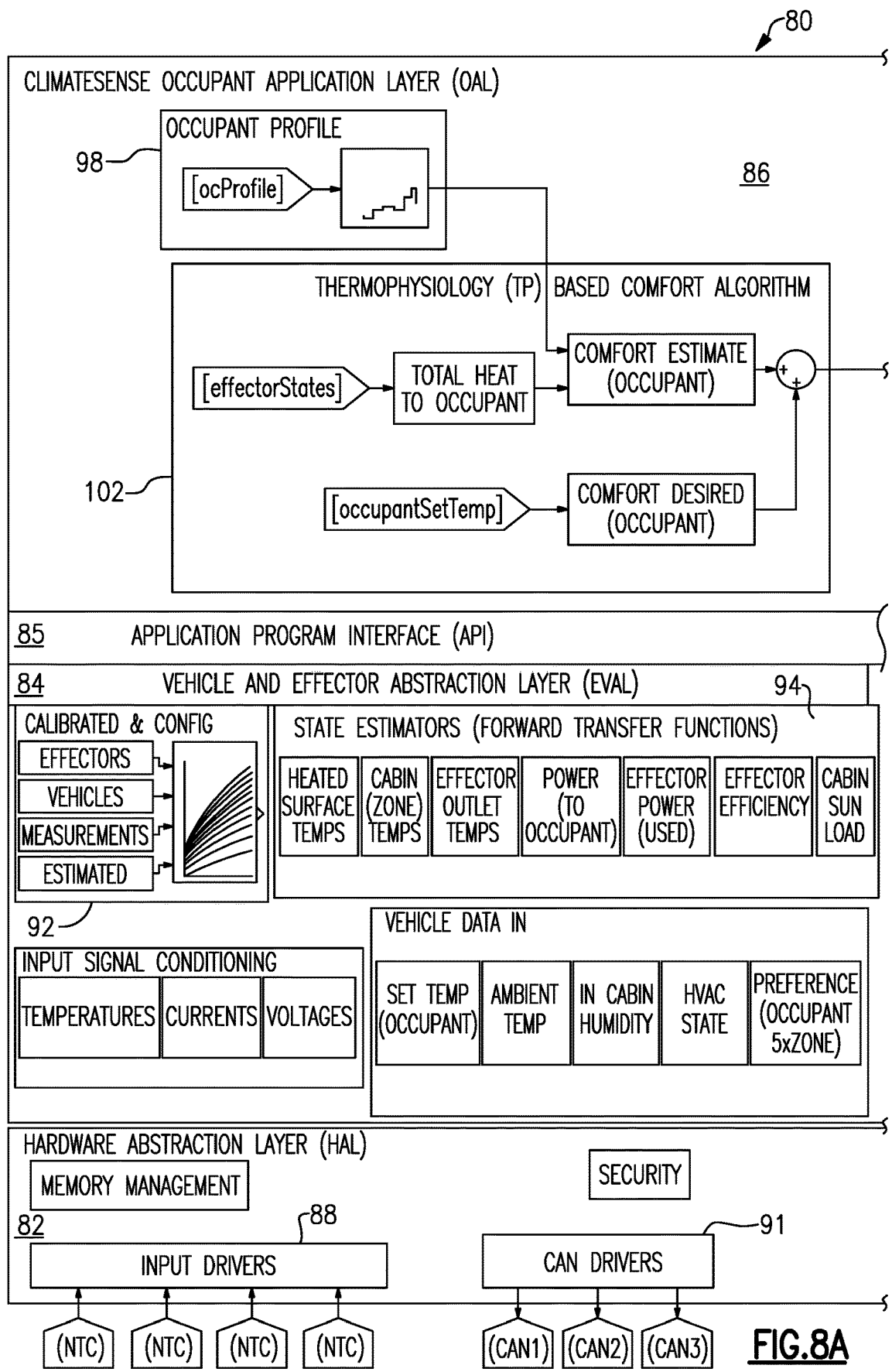
FIGS. 8A-B illustrate an example implementation of the software architecture of FIG. 7.
Figure 8B:
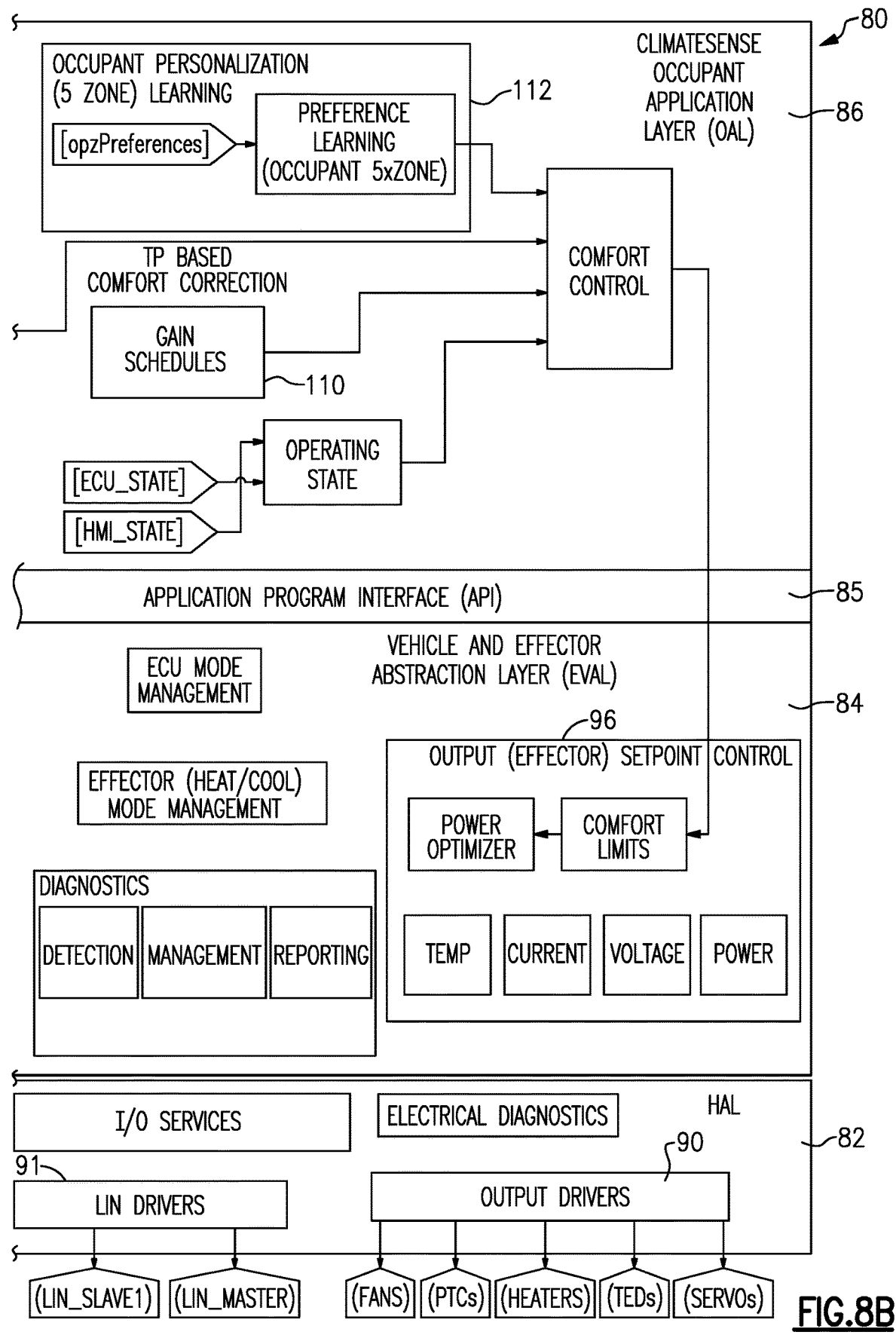

FIGS. 8A and 8B collectively illustrate two halves of an example implementation of the software architecture 80 of FIG. 7 that is split into the two figures only for purposes of illustration. As shown in FIGS. 8A-B, the input drivers 88 receive input from Negative Temperature Coefficient (NTC) temperature sensors, and the bus drivers 91 can include CAN and LIN bus drivers. The output drivers 90 can control fans, Positive Temperature Coefficient (PTC) heaters, resistive heaters, thermoelectric devices, and servoelectric devices (e.g., flaps and/or airflow mixers). The HAL 82 provides for memory management, security (e.g., allowing or disallowing reflashing of the memory of the controller 44), and electrical diagnostics (e.g., detecting fault conditions of the various thermal effectors 40. Although not shown in FIGS. 8A-B, it is understood that an interface exists between the HAL-EVAL which follows a strict configuration to ensure abstraction and portability of the software.

The EVAL 84 provides for the signal conditioning discussed above (e.g., converting from volts or amps to specific temperatures). The setpoint control 96 can determine specific control commands for the thermal effectors 40 (e.g., temperatures, current values, voltage values, power values, etc.).

The OAL 86 includes gain schedules 110 which could indicate how OTS can vary over time. For example, a typical occupant 50 may enjoy a certain degree of thermal conditioning in a particular OPZ 42 when initially entering a vehicle (e.g., hand and/or neck warming), but that level may change after a certain time period (e.g., 10 or 20 minutes), at which time the occupant may want to diminish the level of thermal conditioning being provided in that OPZ 42.

A preference and/or learning module 112 provides for storing or learning occupant 50 preferences over time. For example, if a driver and their front seat passenger consistently use the same temperature offsets over many driving sessions, the OAL 86 may store those offsets for future use and may automatically utilize them as default values.

Although only a single occupant 50 was described for much of the discussion above, it is to be understood that the same functionality could be provided for each of a plurality of occupants in a vehicle 50 that are seated in a vehicle cabin area that offers microclimate thermal conditioning. Thus, the OAL 86 may have multiple instances running on the controller 44 that each support a particular one of the occupants 50.

The software architecture 80 improves the portability of source code to other systems, because the OAL is entirely or largely the same, and the primary adjustments are in the vehicle profile 92. If a particular ECU is being replaced by a different type or model of ECU, the primary, and possibly only, only updates to be made would be in the HAL 82. The software architecture 80 is effectively constructed from building blocks (see the items in FIGS. 8A-B), such that the relevant software or calibration changes but other elements remain the same when a specific effector or cabin specification is changed.

The architecture 80 also provides for convenient implementation of distributed control in the MTCS 14. For example, the HAL 82 and EVAL 84 could run on multiple ECUs, but provide input to a primary ECU that runs the OAL 86 for both ECUs. Thus, the computational burden that may otherwise be imposed on a single ECU could be conveniently distributed throughout a vehicle.

Figure 9:
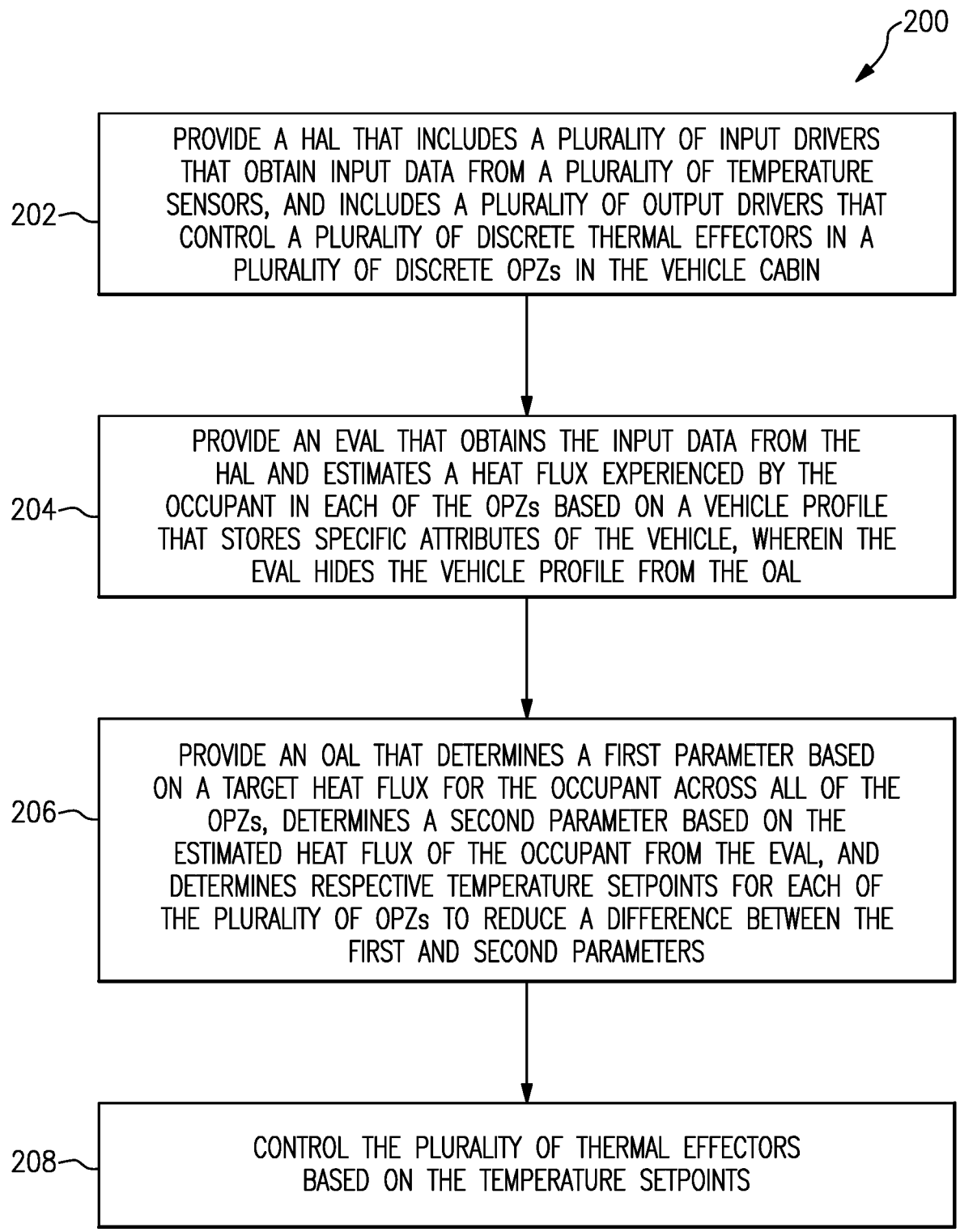
FIG. 9 is a flowchart that depicts an example method of providing thermal conditioning in a vehicle cabin.

FIG. 9 is a flowchart 200 that depicts an example method of providing thermal conditioning in a vehicle cabin 24. The controller 44 is configured to perform the various steps in the flowchart 200 in one example. The method includes providing a HAL 82 (step 202) that includes a plurality of input drivers 88 that obtain input data from a plurality of temperature sensors, and includes a plurality of output drivers 90 that control a plurality of discrete thermal effectors 40 in a plurality of discrete OPZs 42 in the vehicle cabin 24 (see FIG. 7).

The method includes providing an EVAL 84 (step 204) that obtains the input data from the HAL 84 and estimates a heat flux experienced by an occupant 50 in each of the OPZs 42 (see, e.g., OTS_est in FIG. 2) based on a vehicle profile 92 that stores specific attributes of the vehicle.

The method includes providing an OAL 86 (step 206) that determines a first parameter based on a target heat flux for the occupant 50 across all of the OPZs 42 (see, e.g., OTS_target in FIG. 2), determines a second parameter based on the estimated heat flux of the occupant from the EVAL 84 (see, e.g., OTS_est in FIG. 2), and determines respective temperature setpoints for each of the plurality of OPZs 42 (see outputs from OAL 86 to setpoint control 96 in FIG. 6) to reduce a difference between the first and second parameters. In one example, the EVAL 84 hides the vehicle profile 92 from the OAL 86. The method includes controlling the plurality of thermal effectors 40 based on the temperature setpoints (step 208).

Using the techniques discussed herein, the same OAL 86 may be used to provide the software functionality and calibration for a wide variety of applications, and achieve the same occupant experience due to the software architecture and abstraction. Similarly, the same HAL 84 may be used for different sets of electrical hardware, regardless of what vehicle or application or seat, etc. is being thermally conditioned. Moreover, the same EVAL 84 may be used for the same effectors in a variety of different vehicle environments.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method of providing thermal conditioning in a vehicle cabin, comprising:
   providing a hardware abstraction layer (HAL) that includes a plurality of input drivers that obtain input data from a plurality of temperature sensors, and includes a plurality of output drivers that control a plurality of discrete thermal effectors in a plurality of discrete occupant personalization zones (OPZs) in the vehicle cabin;
   providing a vehicle and effector abstraction layer (EVAL) that obtains the input data from the HAL and estimates a heat flux experienced by an occupant in each of the OPZs based on a vehicle profile that stores specific attributes of the vehicle;
   providing an occupant application layer (OAL) that determines a first parameter based on a target heat flux for the occupant across all of the OPZs, determines a second parameter based on the estimated heat flux of the occupant from the EVAL, and determines respective temperature setpoints for each of the plurality of OPZs to reduce a difference between the first and second parameters, wherein the EVAL hides the vehicle profile from the OAL; and
   controlling the plurality of thermal effectors based on the temperature setpoints.

2. The method of claim 1, wherein the specific attributes of the vehicle include a quantity and type of the thermal effectors in each OPZ.

3. The method of claim 1, wherein the vehicle profile includes a cabin sun load model for estimating a sun load in the vehicle cabin, and the EVAL utilizes the cabin sun load model when estimating the heat flux in at least one of the OPZs.

4. The method of claim 1, wherein the HAL converts at least a portion of the input data from a first type to a second type prior to providing the input data to the EVAL, the second type having different units than the first type.

5. The method of claim 4, wherein the first type includes at least one of current and voltage measurements, and the second type includes temperature measurements.

6. The method of claim 1, wherein:
the EVAL determines a temperature in each OPZ based on the input data from the HAL; and
for each OPZ, the EVAL controls each thermal effector in the OPZ based on a difference between the temperature setpoint for the OPZ and the determined temperature for the OPZ.

7. The method of claim 6, wherein:
the vehicle profile includes an indication of how aggressively temperature setpoints should be pursued; and
the EVAL determines how aggressively to pursue the temperature setpoint for each OPZ based on the indication.

8. The method of claim 1, wherein:
the OAL stores a first temperature range for each thermal effector that includes a minimum setpoint and a maximum setpoint for the thermal effector;
the EVAL stores a second temperature range for a particular one of the thermal effectors that differs from and constrains the first temperature range for the particular one of the thermal effectors; and
the EVAL adjusts the temperature setpoint for a particular OPZ within which the particular one of the thermal effectors resides based on the temperature setpoint falling outside of the second temperature range.

9. The method of claim 1, comprising:
providing a graphical user interface to the occupant using an electronic display in the vehicle;
wherein based on receiving an OPZ disable command for a particular one of the OPZs, the OAL commands the EVAL to disable each thermal effector in the particular one of the OPZs.

10. The method of claim 1, wherein:
by default, the OAL determines the first and second parameter for the occupant based on a default occupant profile; and
the OAL updates the default occupant profile based on receiving occupant data through a graphical user interface, the occupant data indicating at least one of occupant gender, occupant weight, and occupant clothing.

11. The method of claim 1, comprising:
providing a graphical user interface to the occupant that displays a visual indicator of the temperature setpoint in each OPZ; and
wherein based on receiving a temperature offset for a particular OPZ, the OAL adjusts the determined temperature setpoint for the particular OW to accommodate the temperature offset.

12. The method of claim 1, comprising:
providing a graphical user interface (GUI) to the occupant that displays a visual indicator of a fan speed of an effector in a particular one of the OPZs; and
wherein based on receiving a fan speed offset for the particular OPZ from the GUI, OAL transmits an indication of the fan speed offset to the EVAL, and the EVAL adjusts the fan speed of the effector based on the fan speed offset.

13. The method of claim 1, wherein:
said providing the HAL and said providing the EVAL are performed by a first ECU associated with a first subset of the OPZs, and also by a second ECU associated with a second subset of the OPZs, wherein the second ECU is separate from the first ECU, and the first subset and second subset are not associated with any of the same OPZs; and
said providing the OAL is performed in the first ECU based on heat flux estimates from the EVAL of both the first ECU and second ECU.

14. The method of claim 1, wherein the first parameter and second parameter are each Overall Thermal Sensation (OTS) parameters that are quantified using the Berkley sensation scale.

15. A thermal conditioning system in a vehicle cabin, comprising:
a plurality of thermal effectors arranged into a plurality of discrete occupant personalization zones (OPZs) that are each associated with a different occupant body areas, such that each OPZ includes at least one of the thermal effectors; and
a controller configured to:
provide a hardware abstraction layer (HAL) that includes a plurality of input drivers that obtain input data from a plurality of temperature sensors, and includes a plurality of output drivers that control a plurality of discrete thermal effectors in the plurality OPZs in the vehicle cabin;
provide a vehicle abstraction layer (EVAL) that obtains the input data from the HAL and estimates a heat flux experienced by the occupant in each of the OPZs based on a vehicle profile that stores specific attributes of the vehicle;
provide an occupant application layer (OAL) that determines a first parameter based on a target heat flux for the occupant, determines a second parameter based on the estimated heat flux of the occupant from the EVAL, and determines respective temperature setpoints for each of the plurality of OPZs to reduce a difference between the first and second parameters, wherein the EVAL hides the vehicle profile from the OAL; and
control the plurality of thermal effectors based on the temperature setpoints.

16. The thermal conditioning system of claim 15, wherein the specific attributes of the vehicle include a quantity and type of the thermal effectors in each OPZ.

17. The thermal conditioning system of claim 15, wherein the vehicle profile includes a cabin sun load model for estimating a sun load in the vehicle cabin, and the EVAL utilizes the cabin sun load model when estimating the heat flux in at least one of the OPZs.

18. The thermal conditioning system of claim 15, wherein:
the controller is configured to operate the EVAL to determine a temperature in each OPZ based on the input data from the HAL; and
for each OPZ, the controller is configured to operate the EVAL to control each thermal effector in the OPZ based on a difference between the temperature setpoint for the OPZ and the determined temperature for the OPZ.

19. The thermal conditioning system of claim 18, wherein:
- the vehicle profile includes an indication of how aggressively temperature setpoints should be pursued; and
- the controller is configured to operate the EVAL to determine how aggressively to pursue the temperature setpoint for each OPZ based on the indication.

20. The thermal conditioning system of claim 15, wherein the controller is configured to operate the OAL to:
- by default, determine the first and second parameters for the occupant based on a default occupant profile; and
- update the default occupant profile based on receiving occupant data through a graphical user interface, the occupant data indicating at least one of occupant gender, occupant weight, and occupant clothing.

* * * * *